US008602938B1

(12) United States Patent
Conlon et al.

(10) Patent No.: US 8,602,938 B1
(45) Date of Patent: Dec. 10, 2013

(54) MULTIMODE ELECTRICALLY VARIABLE TRANSMISSION HAVING A FERRITE MAGNET MOTOR AND METHOD OF OPERATING THE SAME

(75) Inventors: Brendan M. Conlon, Rochester Hills, MI (US); Khwaja M. Rahman, Troy, MI (US); Trevor John Blohm, Brighton, MI (US); Sinisa Jurkovic, Sterling Heights, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 13/543,006

(22) Filed: Jul. 6, 2012

(51) Int. Cl.
*B60K 1/02* (2006.01)

(52) U.S. Cl.
USPC .............................................. 477/3

(58) Field of Classification Search
USPC .................................... 477/3; 475/5; 701/22
See application file for complete search history.

(56) References Cited

U.S. PATENT DOCUMENTS

| 2013/0116076 A1* | 5/2013 | Tamai et al. | 475/5 |
| 2013/0116077 A1* | 5/2013 | Tamai et al. | 475/5 |

* cited by examiner

*Primary Examiner* — Dirk Wright
(74) *Attorney, Agent, or Firm* — Quinn Law Group, PLLC

(57) ABSTRACT

A hybrid vehicle includes an internal combustion engine, a ferrite magnet motor and a rare earth magnet motor. When the vehicle is cruising at a steady speed, an electrically variable transmission mode of a transmission configures the rare earth magnet motor to provide a reaction force to the ferrite magnet motor so that the ferrite magnet motor operates at a high speed/low torque condition to minimize torque dependent losses in the ferrite magnet motor. When the vehicle is accelerating at higher speeds, a first torque transmitting mechanism provides a reaction torque to the ferrite magnet motor to eliminate the torque dependent losses in the ferrite magnet motor.

16 Claims, 2 Drawing Sheets

MULTIMODE ELECTRICALLY VARIABLE TRANSMISSION HAVING A FERRITE MAGNET MOTOR AND METHOD OF OPERATING THE SAME

TECHNICAL FIELD

The invention generally relates to a powertrain for a hybrid vehicle, and to a method of operating the powertrain.

BACKGROUND

Vehicles include a drivetrain that may include a charge sustaining or charge depleting (CS/CD) hybrid propulsion configuration (which may or may not be designed to accept battery charge power from an external electric energy source, i.e., a plug in hybrid) or a range extended full electric propulsion configuration to propel the vehicle. In either configuration, the drivetrain includes an internal combustion engine, and an electrically variable transmission including a first motor/generator and a second motor/generator. The range extended full electric configuration, used in an extended range electric vehicle (EREV), must be capable of propelling the vehicle on battery power alone until the battery charge is depleted. At that time it transitions to an operating strategy similar to a conventional hybrid in which the engine is operated during some driving conditions to provide drive power and maintain battery state-of-charge. The CS/CD hybrid configuration generally requires the engine to operate in order to provide full vehicle power, and is designed to be capable of operating as an electric vehicle only at lower powers. In either configuration, vehicle propulsion may come from any of the internal combustion engine, the first motor/generator, the second motor/generator, or any combination thereof. Either configuration is also capable of charging the battery by operating one or both electric motors as a generator while the engine is running. Hybrid propulsion configurations generally require a larger internal combustion engine, and utilize smaller batteries than vehicles utilizing the full electric propulsion configuration. For example, a passenger car vehicle utilizing the full electric propulsion configuration may include a battery having a power output of greater than 100 KW, whereas vehicles utilizing the hybrid propulsion configuration may only require a battery having a power output of between 30 and 40 KW. The additional available battery power may be used to reduce the power required from the engine to provide the same vehicle performance.

The different operating strategies between the differing propulsion systems lead to substantially different usage of the electric motor/generators. For example, the electric motor/generators of the full electric propulsion configuration tend to operate at higher speeds and higher powers during operation as an electric vehicle, whereas electric motor/generators of the hybrid propulsion configuration tend to operate at lower speeds and lower powers. Additionally, one or both of the motor/generators in a full electric propulsion configuration typically require a high torque capability to provide adequate launch and reverse gradeability performance. The high torque required from the motor/generator tends to reduce the power and efficiency of the motor/generator at high speeds. Accordingly, the full electric propulsion configuration and the hybrid propulsion configuration generally employ different transmission power flows, and utilize different electric motors.

The hybrid electrically variable transmission typically includes either strong rare earth permanent magnet motors, or large induction motors, in order to attain the desired efficiency. Rare earth magnets are expensive, thereby increasing the costs of the rare earth permanent magnet motors, while the induction motors are larger and require additional packaging space.

SUMMARY

A powertrain for a hybrid vehicle is provided. The powertrain includes a ferrite magnet motor, a rare earth magnet motor, an internal combustion engine, and a transmission. The transmission includes an output configured for transmitting a torque to at least one wheel of the vehicle. A first planetary gearset is connected to the output, the ferrite magnet motor, and the internal combustion engine. A second planetary gearset is connected to the output and the rare earth magnet motor. A first torque transmitting mechanism selectively engages and disengages the second planetary gearset. The first torque transmitting mechanism connects the second planetary gearset to a stationary member when the first torque transmitting mechanism is engaged, thereby providing a reaction torque. A second torque transmitting mechanism selectively connects and disconnects torque transmission between the ferrite magnet motor and a node of the second planetary gearset attached to the rare earth magnet motor. The transmission is operable in a fixed gear mode and in two electrically variable transmission modes. When in the fixed gear mode, both the first torque transmitting mechanism and the second torque transmitting mechanism are engaged, and the internal combustion engine is operating. When operating in the fixed gear mode, the reaction torque from the stationary member transmitted through the first and second torque transmitting mechanisms allows the ferrite magnet motor to be in a state of zero torque, eliminating torque dependent losses in the ferrite magnet motor. The first electrically variable transmission mode is used primarily for launching the vehicle and high acceleration rates. When in the first electrically variable transmission mode, the first torque transmitting mechanism is engaged, the second torque transmitting mechanism is disengaged, and the internal combustion engine is operating. When operating in the first eclectically variable transmission mode, the vehicle launch torque is supplied primarily by the rare earth magnet motor. The second eclectically variable transmission mode is sued primarily for low acceleration rates and constant speed driving at high speeds. When in the second electrically variable transmission mode, the first torque transmitting mechanism is disengaged, the second torque transmitting mechanism is engaged, and the internal combustion engine is operating. When operating in the second electrically variable transmission mode, the rare earth magnet motor provides the majority of reaction torque to the engine so that the ferrite magnet motor operates in a high speed/low torque condition to minimize torque dependent losses in the ferrite magnet motor.

A transmission for a hybrid vehicle having an internal combustion engine is also provided. The transmission includes a ferrite magnet motor selectively operable to provide torque to power the hybrid vehicle, and a rare earth magnet motor selectively operable to provide torque to power the hybrid vehicle. An output is configured for transmitting torque to at least one wheel of the vehicle. A first planetary gearset is connected to the output and the ferrite magnet motor. A second planetary gearset is connected to the output and the rare earth magnet motor. A first torque transmitting mechanism selectively connects and disconnects the second planetary gearset to a stationary member. The first torque transmitting mechanism provides a reaction torque to the second planetary gearset when the first torque transmitting mechanism is engaged. A second torque transmitting mechanism selectively connects and disconnects torque transmission between the ferrite magnet motor and a node of the second planetary gearset attached to the rare earth magnet motor. When in the first electrically variable transmission mode, the first torque transmitting mechanism is engaged, the second torque transmitting mechanism is disengaged, and the internal combustion engine is operating. When operating in the first electrically variable transmission mode, the vehicle launch torque is supplied primarily by the rare earth magnet motor. The transmission is operable in a second electrically variable transmission mode with the first torque transmitting mechanism disengaged, and the second torque transmitting mechanism engaged. When the vehicle is cruising at a steady speed and operating in the second electrically variable transmission mode, the rare earth magnet motor provides the majority of the reaction torque for the engine so that the ferrite magnet motor operates in a high speed/low torque condition to minimize torque dependent losses in the ferrite magnet motor.

A method of controlling a powertrain of a hybrid vehicle having an internal combustion engine, a rare earth magnet motor, and a ferrite magnet motor is also provided. The method includes engaging the internal combustion engine to provide torque to an output of a transmission. A fixed gear mode of the transmission is implemented when the vehicle is accelerating at higher speeds. An electrically variable transmission mode is implemented when the vehicle is cruising at a steady speed, with a rotational speed of the internal combustion engine less than a rotational speed of the output, the rare earth magnet motor operating at a low or negative rotational speed, and the ferrite magnet motor operating at a rotational speed higher than the rotational speed of the output. Implementing the fixed gear mode includes engaging a first torque transmitting mechanism to provide a reaction torque to a second planetary gearset, and engaging a second torque transmitting mechanism to allow torque transmission between the ferrite magnet motor and the stationary member through the first torque transmitting mechanism. The reaction torque from the stationary member allows the ferrite magnet motor to operate in a state of zero torque, eliminating torque dependent losses in the ferrite magnet motor. Implementing the second electrically variable transmission mode includes disengaging the first torque transmitting mechanism, and engaging second torque transmitting mechanism to allow torque transmission between the ferrite magnet motor and the rare earth magnet motor. Disengaging the first torque transmitting mechanism and engaging the second torque transmitting mechanism allows the rare earth magnet motor to provide the majority of reaction torque to the engine so that the ferrite magnet motor operates in a high speed/low torque condition to minimize torque dependent losses.

The ferrite magnet motor tends to have higher torque dependent losses compared to the rare earth magnet motor, and tends to have lower speed dependent losses compared to the rare earth magnet motor. The powertrain is designed to allow the rare earth magnet motor to provide most of the electrically generated torque to drive the vehicle, whether alone or in combination with the internal combustion engine, and uses the ferrite magnet motor for supplemental power when needed. When operating as an electric vehicle with the engine off, engaging the first torque transmitting mechanism to provide the reaction torque to the second planetary gearset allows the rare earth magnet motor to propel the vehicle, eliminating the torque dependent losses of the ferrite magnet motor, and making the ferrite magnet motor suitable for use as the supplemental electric motor. When the vehicle is accelerating with the engine on, the vehicle may operate in the fixed gear mode with the ferrite magnet motor in a state of zero torque. When the vehicle is cruising at a steady speed, the rare earth magnet motor provides the majority of reaction torque to the engine to minimize the torque dependent losses of the ferrite magnet motor, thereby making the ferrite magnet motor suitable for use as the supplemental electric motor. Accordingly, the method of controlling the powertrain of the hybrid vehicle allows for the use of one ferrite magnet motor and only one rare earth magnet motor, thereby decreasing the manufacturing costs of the powertrain while still maintaining a high efficiency in the hybrid powertrain.

The above features and advantages and other features and advantages of the present invention are readily apparent from the following detailed description of the best modes for carrying out the invention when taken in connection with the accompanying drawings.

DETAILED DESCRIPTION

Those having ordinary skill in the art will recognize that terms such as "above," "below," "upward," "downward," "top," "bottom," etc., are used descriptively for the figures, and do not represent limitations on the scope of the invention, as defined by the appended claims.

Referring to the Figures, wherein like numerals indicate like parts throughout the several views, a powertrain is generally shown at 20. The powertrain 20 is for a hybrid vehicle, in which a combination of an internal combustion engine 22 and at least one electric motor 24, 26 are used to power the vehicle; or an extended range electric vehicle capable of operating as a full electric vehicle, in which at least one electric motor 24, 26 is used to power the vehicle until battery energy is depleted to a predefined level.

Figure 1:
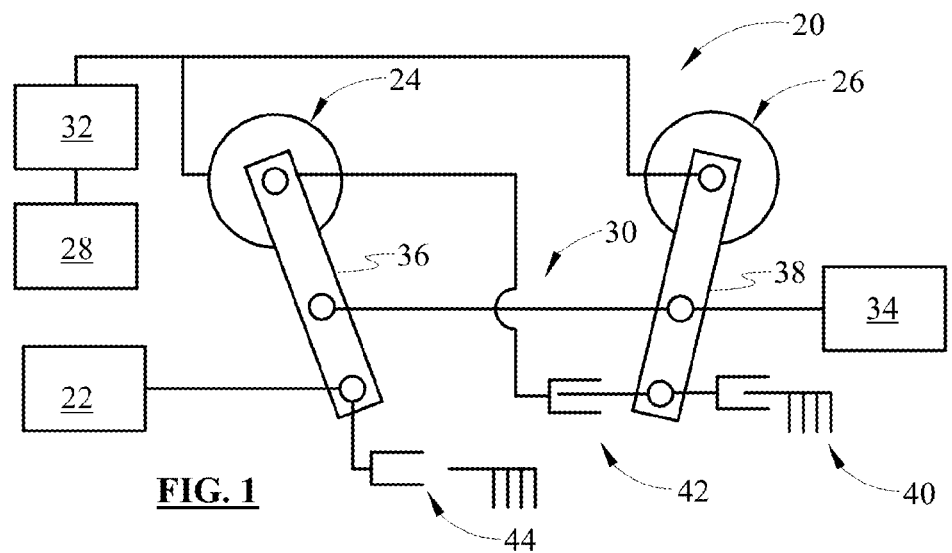
FIG. 1 is a schematic lever diagram of a powertrain of a vehicle in a fixed gear mode.
Figure 2:
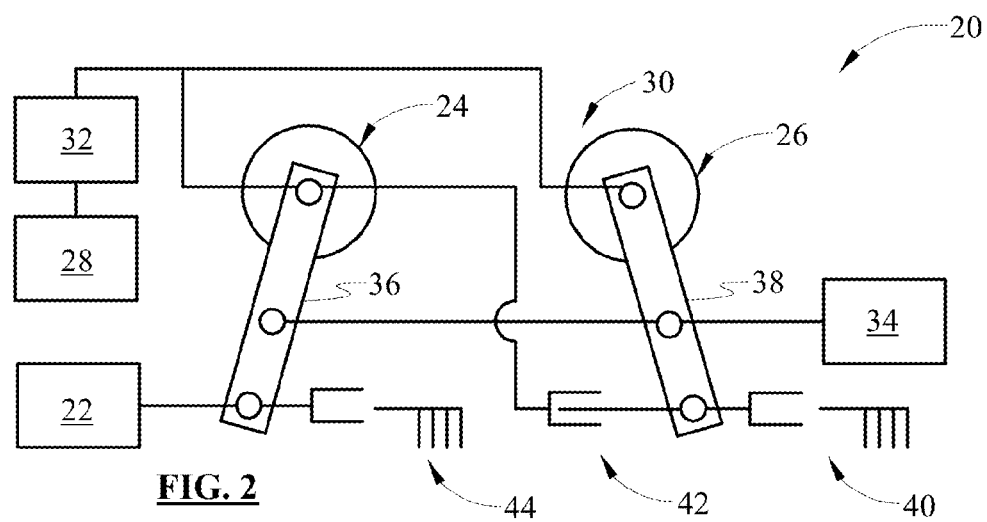
FIG. 2 is a schematic lever diagram of the powertrain in an electrically variable transmission mode.
Figure 3:
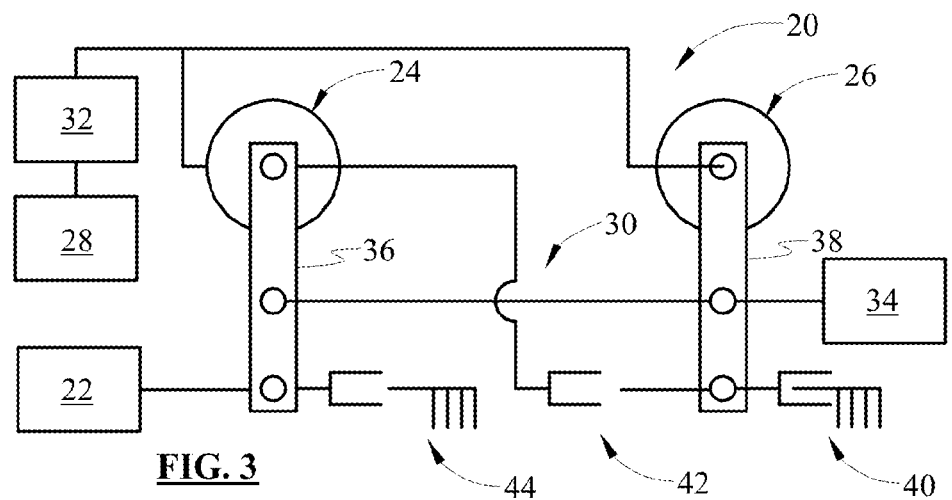
FIG. 3 is a schematic lever diagram of the powertrain in an electric vehicle mode.

Referring to FIGS. 1 through 3, the powertrain 20 is illustrated in a lever diagram format. A lever diagram is a schematic representation of the components of a mechanical device such as an automatic transmission 30. Each individual lever represents a planetary gearset or an external gear set. In the planetary gear set levers, the three basic mechanical components of the planetary gear are each represented by a node. Therefore, a single planetary gear set lever contains three nodes: one for the sun gear member, one for the planet gear carrier member, and one for the ring gear member. The relative length between the nodes of each planetary gear set lever can be used to represent the ring-to-sun ratio of each respective gearset. These lever ratios, in turn, are used to vary the gear ratios of the transmission 30 in order to achieve appropriate ratios and ratio progression. Mechanical couplings or interconnections between the nodes of the various planetary gear sets are illustrated by thin, horizontal lines and torque transmitting devices such as clutches and brakes are presented as interleaved fingers. If the device is a brake, one set of the fingers is grounded. Vertical dashed lines with a grounded pivot point represent external gear sets. Further explanation of the format, purpose and use of lever diagrams can be found in SAE Paper 810102, authored by Benford, Howard and Leising, Maurice, "The Lever Analogy: A New Tool in Transmission 30 Analysis", 1981, which is hereby fully incorporated by reference.

Referring to FIGS. 1 through 3, the powertrain 20 includes a first electric motor, hereinafter referred to as a ferrite magnet motor 24, a second electric motor, hereinafter referred to as a rare earth magnet motor 26, the internal combustion engine 22, and a transmission 30. Each of the ferrite magnet motor 24 and the rare earth magnet motor 26 are coupled to, or integrated into and part of the transmission 30. The internal combustion engine 22 is also coupled to the transmission 30. The transmission 30 selectively interconnects the ferrite magnet motor 24, the rare earth magnet motor 26 and the internal combustion engine 22 to provide different operating modes. The internal combustion engine 22 may include any suitably sized and/or configuration of engine 22, such as a gasoline engine or a diesel engine.

The powertrain 20 may further include the battery 28 and a controller 32, each coupled to both the ferrite magnet motor 24 and the rare earth magnet motor 26. The battery 28 provides power to and/or receives power from both of the ferrite magnet motor 24 and the rare earth magnet motor 26. Accordingly, each of the ferrite magnet motor 24 and the rare earth magnet motor 26 may be defined as motor/generators. The controller 32 controls the operation of the ferrite magnet motor 24 and the rare earth magnet motor 26, and may further control the operation of the transmission 30 as well. Alternatively, the powertrain 20 may include a dedicated transmission controller for controlling the operation of the transmission 30. The controller 32 is configured for controlling the power flow between the battery 28, the ferrite magnet motor 24 and the rare earth magnet motor 26.

The transmission 30 includes an output 34 that transmits a torque to at least one wheel of the vehicle. A first planetary gearset 36 is disposed in torque transmitting communication with the output 34, the ferrite magnet motor 24 and the internal combustion engine 22. A second planetary gearset 38 is disposed in torque transmitting communication with the output 34 and the rare earth magnet motor 26. The first planetary gearset 36 and the second planetary gearset 38 each provide independent fixed ratio paths to the output 34 for the ferrite magnet motor 24 and the rare earth magnet motor 26 respectively.

The transmission 30 further includes a first torque transmitting mechanism 40 and a second torque transmitting mechanism 42. Additionally, the transmission 30 may further include a third torque transmitting mechanism 44. The third torque transmitting mechanism 44 may be omitted if the required level of electric performance is low, and is included when the required level of electric performance is high. The first torque transmitting mechanism 40 selectively engages and disengages the second planetary gearset 38. When the first torque transmitting mechanism 40 is engaged, the first torque transmitting mechanism 40 provides a reaction torque to the second planetary gearset 38 to allow the rare earth magnet motor 26 to transmit full power through the second planetary gearset 38 to the output 34. The second torque transmitting mechanism 42 selectively couples and de-couples the ferrite magnet motor 24 and the second planetary gearset 38, thereby coupling and de-coupling the ferrite magnet motor 24 and the rare earth magnet motor. The third torque transmitting mechanism 44 selectively engages and disengages the first planetary gearset 36. When the internal combustion engine 22 is off, i.e., is not running and at zero speed, and when the third torque transmitting mechanism 44 is engaged, the third torque transmitting mechanism 44 provides a reaction torque to the first planetary gearset 36 to allow the ferrite magnet motor 24 to transmit full power through the first planetary gearset 36 to the output 34.

The first torque transmitting mechanism 40, the second torque transmitting mechanism 42 and the third torque transmitting mechanism 44 may each include one of, but are not limited to a clutch, such as for example a rotating friction clutch, a one-way clutch, a dog clutch or some other similar torque transmitting mechanism. Furthermore, the first torque transmitting mechanism 40, the second torque transmitting mechanism 42 and the third torque transmitting mechanism 44 may each be coupled to a stationary member to define a brake. As shown in the Figures, the first torque transmitting mechanism 40 and the third torque transmitting mechanism 44 are each coupled to a stationary member to define a brake.

Referring to FIG. 1, the transmission 30 may operate in a fixed gear mode when the vehicle is accelerating at high speeds or operating at moderately high load. When the transmission 30 is operating in the fixed gear mode, the internal combustion engine 22 is operating, the third torque transmitting mechanism 44 is disengaged, the first torque transmitting mechanism 40 is engaged, and the second torque transmitting mechanism 42 is engaged. When the transmission 30 is disposed in the fixed gear mode with the internal combustion engine 22 operating, i.e., running, the rare earth magnet motor 26 may be used to provide power to the output 34 or to charge the battery 28, and the ferrite magnet motor 24 is locked out to eliminate torque dependent losses in the ferrite magnet motor 24.

Referring to FIG. 2, the transmission 30 may operate in an electrically variable transmission mode when the vehicle is cruising at a steady state condition or accelerating at light load. When the vehicle is cruising in a steady state condition, the powertrain 20 is typically in an over drive condition, in which a rotational speed of the internal combustion engine 22 is less than a rotational speed of the output 34, a rotational speed of the rare earth magnet motor 26 is low or negative, and a rotational speed of the ferrite magnet motor 24 is greater than the rotational speed of the output 34. When the transmission 30 is operating in the electrically variable transmission mode, the internal combustion engine 22 is operating, i.e., running, the first torque transmitting mechanism 40 is disengaged, the second torque transmitting mechanism 42 is engaged, and the third torque transmitting mechanism 44 is disengaged. When the transmission 30 is disposed in the electrically variable transmission mode with the internal combustion engine 22 operating, i.e., running, the rare earth magnet motor 26 is controlled to provide the majority of reaction torque to the engine 22, thereby allowing the ferrite magnet motor 24 to operate at a high speed/low torque condition to minimize torque dependent losses in the ferrite magnet motor 24.

Referring to FIG. 3, the transmission 30 may operate in a rare earth magnet motor electric vehicle mode when the vehicle is operating at low speeds. When the transmission 30 is operating in the rare earth magnet motor electric vehicle mode, the internal combustion engine 22 is not operating, i.e., is turned off, the first torque transmitting mechanism 40 is engaged, the second torque transmitting mechanism 42 is disengaged, and the third torque transmitting mechanism 44 is disengaged. When the transmission 30 is disposed in the rare earth magnet motor electric vehicle mode, only the rare earth magnet motor 26 is used to provide power to the output 34 of the transmission 30.

In addition to the three modes described above, the transmission 30 is also operable in a second electrically variable transmission mode, a dual motor electric vehicle mode, and a ferrite magnet motor electric vehicle mode. When disposed in the second electrically variable transmission mode, the internal combustion engine 22 is operating, the first torque transmitting mechanism 40 is engaged, and the third torque transmitting mechanism 44 and the second torque transmitting mechanism 42 are disengaged. When disposed in the dual motor electric vehicle mode, the internal combustion engine 22 is not operating, the first torque transmitting mechanism 40 and the third torque transmitting mechanism 44 are engaged, and the second torque transmitting mechanism 42 is disengaged. When disposed in the ferrite magnet motor electric vehicle mode, the internal combustion engine 22 is not operating, the first torque transmitting mechanism 40 and the second torque transmitting mechanism 42 are disengaged, and the third torque transmitting mechanism 44 is engaged.

Figure 4:
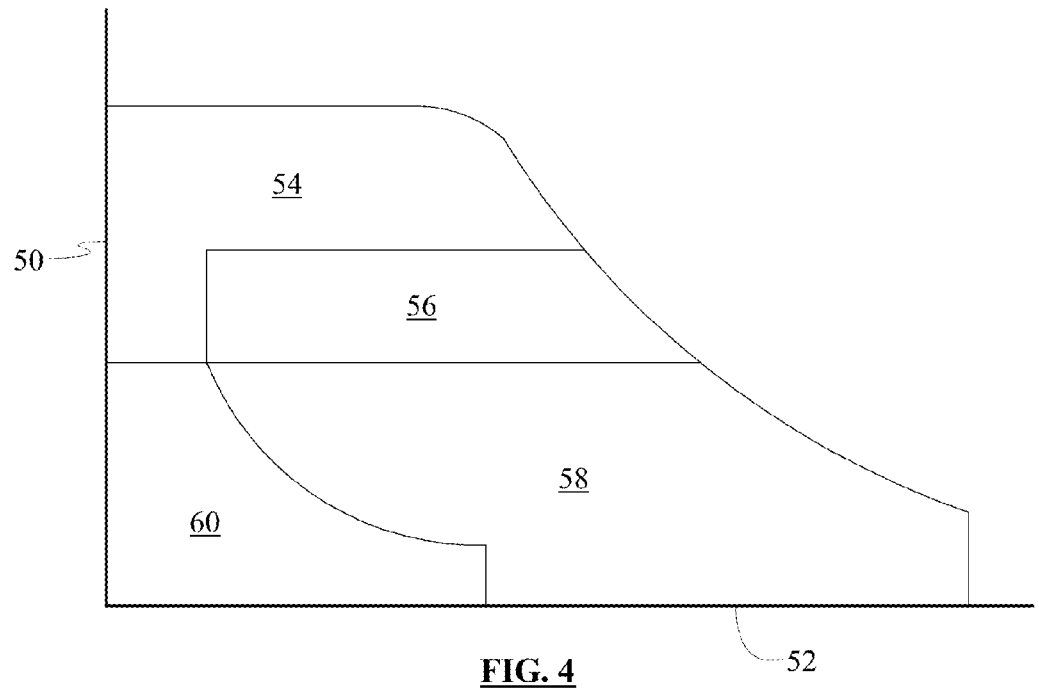
FIG. 4 is a graph showing different operating modes of the powertrain when the vehicle is operating as a hybrid vehicle.

A method of controlling the powertrain 20 is also provided. When operating the vehicle as a hybrid, the vehicle operates as shown in FIG. 4. Referring to FIG. 4, the vehicle tractive force is indicated along a vertical axis 50, and vehicle speed is indicated along a horizontal axis 52. The different operating modes of the vehicle when operating as a hybrid vehicle are shown by the different regions of FIG. 4. The method includes engaging the internal combustion engine 22 to provide torque to the output 34 of the transmission 30, and implementing either the first electrically variable mode when launching at low speeds or high tractive force, indicated by region 55, the fixed gear mode when the vehicle is at moderate tractive force (such as accelerating), indicated by region 56, the second electrically variable transmission mode when the vehicle is cruising at light load, indicated by region 58, or implementing the rare earth magnet motor electric vehicle mode to power the vehicle with torque from the rare earth magnet motor 26 only when the vehicle is operating at low speeds and light loads, indicated by region 60.

Implementing the fixed gear mode includes engaging the first torque transmitting mechanism 40 to provide a reaction torque to the second planetary gearset 38, and engaging the second torque transmitting mechanism 42 to allow torque transmission 30 between the ferrite magnet motor 24 and a grounded node of the second planetary gearset 38. The reaction torque from the first torque transmitting mechanism 40 eliminates torque dependent losses in the ferrite magnet motor 24. Implementing the second electrically variable transmission mode includes disengaging the first torque transmitting mechanism 40, and engaging second torque transmitting mechanism 42 to allow torque transmission 30 between the ferrite magnet motor 24 and a node of the second planetary gearset 38 connected to the rare earth magnet motor 26. The rare earth magnet motor 26 provides the majority of the reaction torque for the engine 22 so that the ferrite magnet motor 24 operates in a high speed/low torque condition to minimize torque dependent losses. Implementing the rare earth magnet motor electric vehicle mode includes disengaging both the third torque transmitting mechanism 44 and the second torque transmitting mechanism 42, disengaging the internal combustion engine 22, i.e., turning off the internal combustion engine 22, engaging the first torque transmitting mechanism 40, and engaging the rare earth magnet motor 26 to provide torque to the output 34 of the transmission 30. Implementing the first electrically variable transmission mode includes engaging the first torque transmitting mechanism 40, and disengaging the second torque transmitting mechanism 42 and the third torque transmitting mechanism 44.

By controlling the powertrain 20 in the above described manner, in which the rare earth magnet motor 26 is used in higher torque demand situations, such as to power the vehicle in an electric only mode when operating at low speeds, or to supplement power from the internal combustion engine 22 during heavy acceleration at higher speeds, the torque dependent losses in the ferrite magnet motor 24 may be minimized. The ferrite magnet motor 24 may then be used as necessary to control engine speed while starting the vehicle and/or provide primary engine reaction torque in the first electrically variable mode, or additional reaction torque in the second electrically variable mode.

Figure 5:
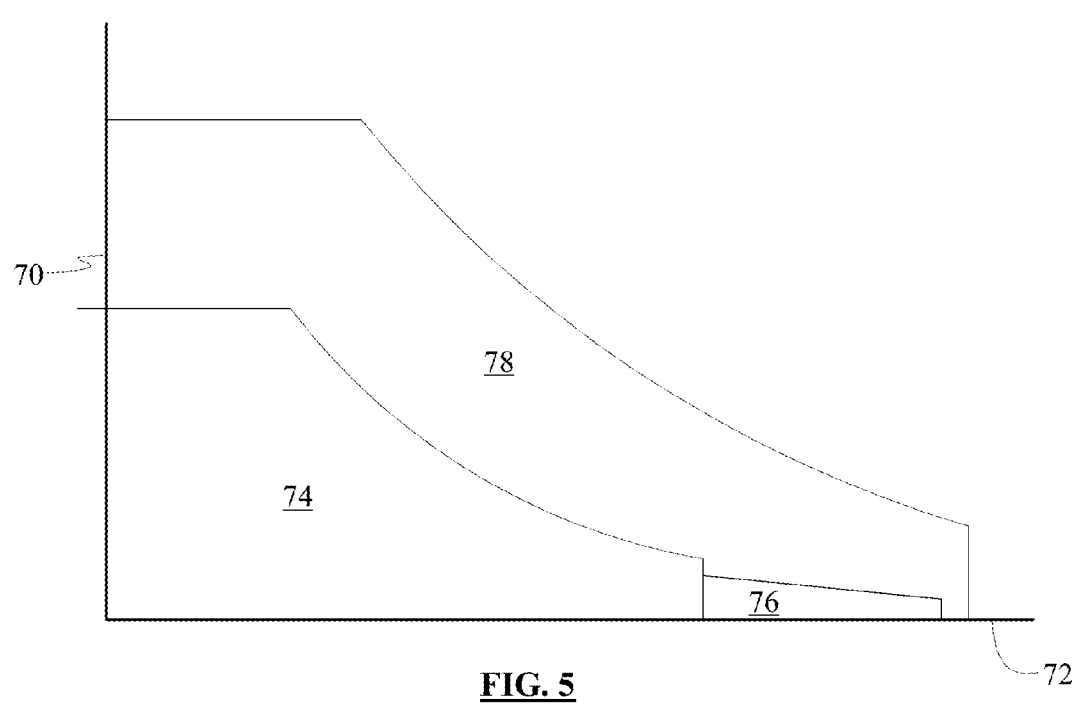
FIG. 5 is a graph showing different operating modes of the powertrain when the vehicle is operating as an extended range electric vehicle.

When operating the vehicle as an electric vehicle, the vehicle operates as shown in FIG. 5. Referring to FIG. 5, the vehicle tractive force is indicated along a vertical axis 70, and vehicle speed is indicated along a horizontal axis 72. The different operating modes of the vehicle when operating as an electric vehicle are shown by the different regions of FIG. 5. The method includes implementing the rare earth magnet motor electric vehicle mode when operating at light load, low speed conditions, indicated by region 74, implementing the ferrite magnet motor electric vehicle mode when operating at light load, high speed conditions, indicated by region 76, and implementing the dual motor mode when operating at high load conditions, indicated by region 78.

The detailed description and the drawings or figures are supportive and descriptive of the invention, but the scope of the invention is defined solely by the claims. While some of the best modes and other embodiments for carrying out the claimed invention have been described in detail, various alternative designs and embodiments exist for practicing the invention defined in the appended claims.

The invention claimed is:

1. A powertrain for a hybrid vehicle, the powertrain comprising:
   a ferrite magnet motor;
   a rare earth magnet motor;
   an internal combustion engine; and
   a transmission including:
      an output configured for transmitting a torque to at least one wheel of the vehicle;
      a first planetary gearset connected to the output, the ferrite magnet motor, and the internal combustion engine;
      a second planetary gearset connected to the output and the rare earth magnet motor;
      a first torque transmitting mechanism selectively engaging and disengaging the second planetary gearset, wherein the first torque transmitting mechanism provides a reaction torque to the second planetary gearset when the first torque transmitting mechanism is engaged; and
      a second torque transmitting mechanism selectively connecting and disconnecting torque transmission between the ferrite magnet motor and a node of the second planetary gearset, wherein the second torque transmitting mechanism connects the ferrite magnet motor and the second planetary gearset when engaged to allow torque transmission therebetween, and wherein the second torque transmitting mechanism disconnects the ferrite magnet motor and the second planetary gearset when disengaged to prevent torque transmission therebetween;
   wherein the transmission is operable in a fixed gear mode with both the first torque transmitting mechanism and the second torque transmitting mechanism engaged and the internal combustion engine operating to eliminate torque dependent losses in the ferrite magnet motor; and wherein the transmission is operable in an electrically variable transmission mode with the first torque transmitting mechanism disengaged, the second torque transmitting mechanism engaged, and the internal combustion engine operating, such that the rare earth magnet motor provides a reaction torque for the ferrite magnet motor so that the ferrite magnet motor operates in a high speed/low torque condition to minimize torque dependent losses in the ferrite magnet motor.

2. A powertrain as set forth in claim 1 wherein the transmission further includes a third torque transmitting mechanism selectively engaging and disengaging the first planetary gearset, wherein the third torque transmitting mechanism provides a reaction torque to the first planetary gearset when the third torque transmitting mechanism is engaged.

3. A powertrain as set forth in claim 2 wherein the transmission is operable in a rare earth magnet motor electric vehicle mode with both the third torque transmitting mechanism and the second torque transmitting mechanism disengaged, the first torque transmitting mechanism engaged, and the internal combustion engine not operating.

4. A powertrain as set forth in claim 1 wherein the transmission is operable in the electrically variable transmission mode when a rotational speed of the internal combustion engine is less than a rotational speed of the output, and a rotational speed of the ferrite motor magnet is greater than the rotational speed of the output.

5. A powertrain as set forth in claim 1 further comprising:
a battery coupled to both the ferrite magnet motor and the rare earth magnet motor, and configured for providing power to both of the ferrite magnet motor and the rare earth magnet motor, and configured for receiving power from at least one of the ferrite magnet motor and the rare earth magnet motor; and
a controller coupled to the ferrite magnet motor and the rare earth magnet motor, the battery and the transmission, and configured for controlling the operation of the ferrite magnet motor, the rare earth magnet motor and the transmission, and configured for controlling the power flow between the battery, the ferrite magnet motor and the rare earth magnet motor.

6. A transmission for a hybrid vehicle having an internal combustion engine, the transmission comprising:
a ferrite magnet motor selectively operable to provide torque to power the hybrid vehicle;
a rare earth magnet motor selectively operable to provide torque to power the hybrid vehicle;
an output configured for transmitting torque to at least one wheel of the vehicle;
a first planetary gearset connected to the output and the ferrite magnet motor;
a second planetary gearset connected to the output and the rare earth magnet motor;
a first torque transmitting mechanism selectively engaging and disengaging the second planetary gearset, wherein the first torque transmitting mechanism provides a reaction torque to the second planetary gearset when the first torque transmitting mechanism is engaged;
a second torque transmitting mechanism selectively connecting and disconnecting torque transmission between the ferrite magnet motor and a node of the second planetary gearset, wherein the second torque transmitting mechanism connects the ferrite magnet motor and the second planetary gearset when engaged to allow torque transmission therebetween, and wherein the second torque transmitting mechanism disconnects the ferrite magnet motor and the second planetary gearset when disengaged to prevent torque transmission therebetween; and wherein the transmission is operable in an electrically variable transmission mode with the first torque transmitting mechanism disengaged and the second torque transmitting mechanism engaged, such that the rare earth magnet motor provides reaction torque for the engine so that the ferrite magnet motor operates in a high speed/low torque condition to minimize torque dependent losses in the ferrite magnet motor when the vehicle is cruising at a steady speed.

7. A transmission as set forth in claim 6 wherein the transmission is operable in the electrically variable transmission mode when a rotational speed of the internal combustion engine is less than a rotational speed of the output, and a rotational speed of the ferrite motor magnet is greater than the rotational speed of the output.

8. A transmission as set forth in claim 6 operable in a fixed gear mode with both the first torque transmitting mechanism and the second torque transmitting mechanism engaged to eliminate torque dependent losses in the ferrite magnet motor when the vehicle is accelerating at a moderate rate.

9. A transmission as set forth in claim 8 further comprising a third torque transmitting mechanism selectively engaging and disengaging the first planetary gearset, wherein the third torque transmitting mechanism provides a reaction torque to the first planetary gearset when the third torque transmitting mechanism is engaged.

10. A transmission as set forth in claim 9 operable in a rare earth magnet motor electric vehicle mode with both the third torque transmitting mechanism and the second torque transmitting mechanism disengaged, and the first torque transmitting mechanism engaged, such that the rare earth magnet motor provides the torque to the output to power the vehicle.

11. A method of controlling a powertrain of a hybrid vehicle having an internal combustion engine, a rare earth magnet motor, and a ferrite magnet motor, the method comprising:
engaging the internal combustion engine to provide torque to an output of a transmission;
implementing a fixed gear mode of the transmission when the vehicle is accelerating at higher speeds; and
implementing an electrically variable transmission mode when the vehicle is cruising at a steady speed, with a rotational speed of the internal combustion engine less than a rotational speed of the output, the rare earth magnet motor operating at a low or negative rotational speed, and the ferrite magnet motor operating at a rotational speed higher than the rotational speed of the output;
wherein implementing the fixed gear mode includes engaging a first torque transmitting mechanism to connect a second planetary gearset to a stationary member, thereby providing reaction torque, and engaging a second torque transmitting mechanism to allow torque transmission between the ferrite magnet motor and a grounded node of the second planetary gearset, wherein the reaction torque from the stationary member is transmitted through the first and second torque transmitting mechanisms to eliminate torque dependent losses in the ferrite magnet motor; and
wherein implementing the electrically variable transmission mode includes disengaging the first torque transmitting mechanism and engaging the second torque transmitting mechanism to allow torque transmission between the ferrite magnet motor and a node of the second planetary gearset, wherein the second torque transmitting mechanism connects the ferrite magnet motor and the second planetary gearset when engaged to allow torque transmission therebetween, allowing the rare earth magnet motor to provide reaction torque for the engine so that the ferrite magnet motor operates in a high speed/low torque condition to minimize torque dependent losses.

12. A method as set forth in claim 11 wherein the transmission includes a third torque transmitting mechanism selectively engaging and disengaging a first planetary gearset, with the third torque transmitting mechanism providing a reaction torque to the first planetary gearset when the third torque transmitting mechanism is engaged.

13. A method as set forth in claim 12 further comprising implementing a rare earth magnet motor electric vehicle mode to power the vehicle with torque from the rare earth magnet motor only when the vehicle is operating at low speeds.

14. A method as set forth in claim 13 wherein implementing the rare earth magnet motor electric vehicle mode includes disengaging both the third torque transmitting mechanism and the second torque transmitting mechanism, disengaging the internal combustion engine, engaging the first torque transmitting mechanism, and engaging the rare earth magnet motor.

15. A method as set forth in claim 12 further comprising disengaging the internal combustion engine to operate the vehicle as an electric vehicle.

16. A method as set forth in claim 15 further comprising:
implementing a rare earth motor electric vehicle mode when operating in light load and low speed conditions;
implementing a ferrite motor electric vehicle mode when operating in high speed conditions; and
implementing a dual motor electric vehicle mode when operating in high load conditions;
wherein implementing the rare earth motor electric vehicle mode includes engaging the first torque transmitting mechanism, disengaging the second torque transmitting mechanism and the third torque transmitting mechanism, and engaging the rare earth magnet motor to provide torque;
wherein implementing the ferrite motor electric vehicle mode includes engaging the third torque transmitting mechanism, disengaging the first torque transmitting mechanism and the second torque transmitting mechanism, and engaging the ferrite magnet motor to provide torque; and
wherein implementing the dual motor electric vehicle mode includes engaging the first torque transmitting mechanism and the third torque transmitting mechanism, disengaging the second torque transmitting mechanism, and engaging both the ferrite magnet motor and the rare earth magnet motor to provide torque.

* * * * *